Patented July 3, 1945

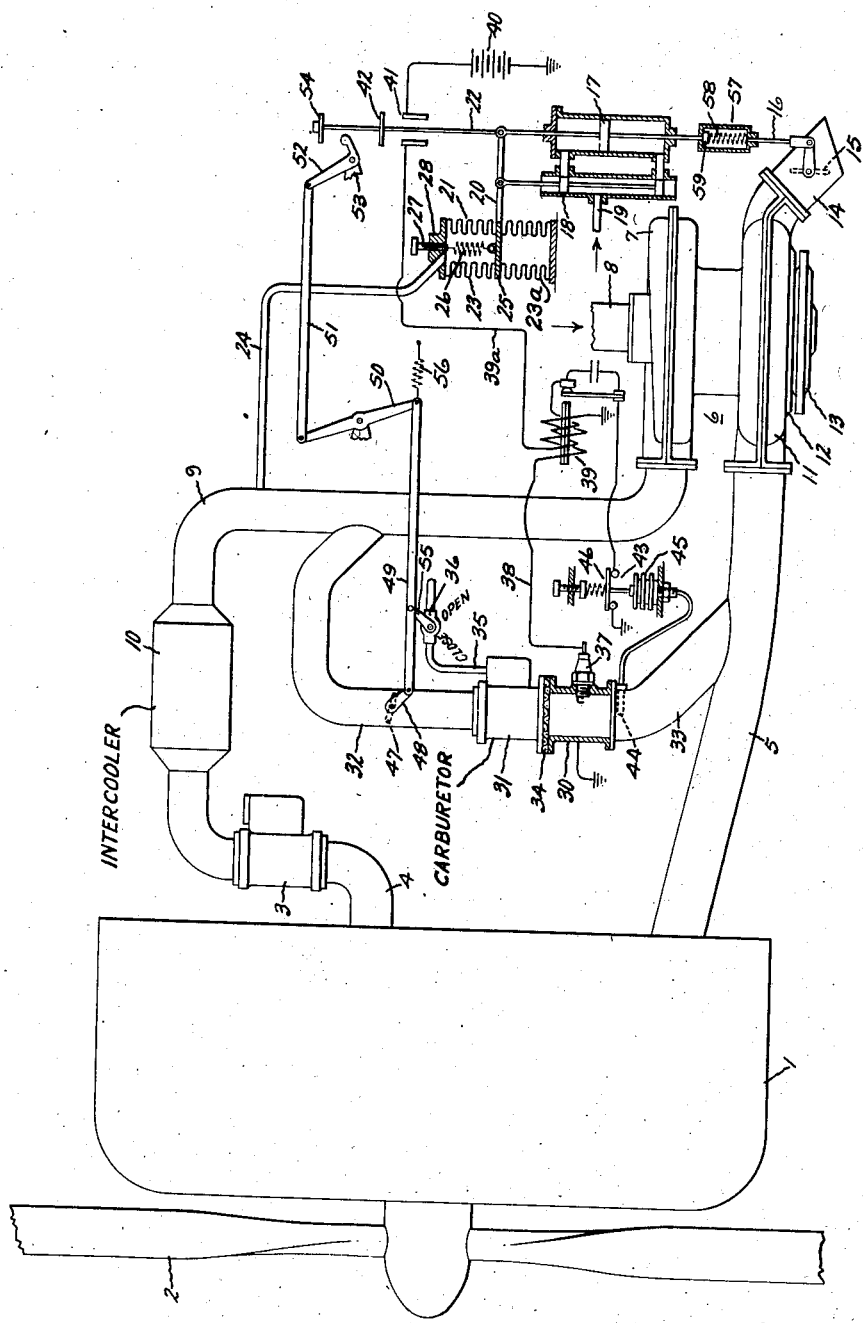

2,379,455

UNITED STATES PATENT OFFICE 2,379,455

ENGINE SUPERCHARGER SYSTEM

David C. Prince, Schenectady, N. Y., assignor to General Electric Company, a corporation of New York Application July 20, 1942, Serial No. 451,545

3 Claims. (Cl. 60—13)

The present invention relates to engine supercharger systems of the type wherein a compressor driven by exhaust gas from the engine is used to supply air to the engine. The invention is especially useful in connection with aircraft engines and it is this application of my invention which I have elected to illustrate and describe. It is to be understood, however, that the invention is not limited thereto necessarily but may be used wherever found applicable.

For a consideration of what I believe to be novel and my invention, attention is directed to the following specification and the claims appended thereto.

In the drawing, the figure is a diagrammatic view of a system embodying my invention.

Referring to the drawing, 1 indicates a part of an aircraft nacelle which houses an internal combustion engine to the shaft of which is connected a propeller 2. The specific structure of the engine forms no part of the present invention and accordingly, it has not been illustrated. The carburetor for the engine is indicated at 3, it being connected to the intake manifold of the engine by a conduit 4, and the exhaust conduit for the engine is indicated at 5. At 6 is indicated a turbosupercharger. The supercharger compressor is indicated at 7. Air is supplied to the compressor through a conduit 8 and is discharged from the compressor through conduit 9 and a suitable intercooler 10 to carburetor 3. The nozzle box of the gas turbine is indicated at 11, the nozzle ring at 12, and the turbine wheel at 13. The exhaust conduit 5 is connected to nozzle box 11 and conveys exhaust gases from the engine to the nozzle box. Connected with the nozzle box is a waste conduit 14 in which is located a waste gate valve 15 which controls the operation of the supercharger. When waste gate valve 15 is wide open, the major portion of the exhaust gases discharge directly to atmosphere, little if any being fed by the nozzles to the turbine wheel. This represents the condition of idle operation. As waste gate valve 15 is gradually closed, fewer gases are discharged to atmosphere and pressure is built up in nozzle box 11 to effect flow of gases through nozzles 12 to the turbine wheel. Maximum power is obtained when valve 15 is entirely closed. Valve 15 is controlled preferably by means responsive to an operating condition of the turbosupercharger, for example, speed, nozzle box pressure or compressor discharge pressure. In the present instance, valve 15 is shown as being under the control of the pressure on the discharge side of compressor 7. To this end, valve 15 is connected by a rod 16 to the piston 17 of a fluid actuated motor or servo-motor, the pilot valve of which is indicated at 18. Fluid pressure for operating the pilot valve is supplied from any suitable source through a conduit 19. The stem of the pilot valve is pivotally connected to a lever 20 which at one end is connected to an absolute pressure responsive device 21 and at the other end to a rod 22 connected to piston 17, this forming a known type of follow-up pilot valve restoring connection. Absolute pressure responsive device 21 comprises an evacuated bellows 23a and a second bellows 23, the interior of which is connected to conduit 9 by a pipe 24. Connected to movable abutment 25 of device 21 is one end of a spring 26, the other end of which is connected to an adjustable rod 27 threaded into a fixed head 28 of bellows 23. By adjusting the tension of spring 26, the pressure responsive device may be set for the desired compressor discharge pressure.

With the above described arrangement, when the pressure in conduit 9 increases, movable abutment 25 is lowered, thus lowering the pilot valve heads to admit fluid pressure to the cylinder of the fluid motor beneath piston 17, thereby causing the piston to move upwardly to open somewhat valve 15. The opening movement of valve 15 permits a greater proportion of available exhaust gases to discharge directly to atmosphere, thereby effecting a decrease in the speed of the turbosupercharger to bring the pressure delivered by the compressor back to the desired value. The upward movement of piston 17 moves the pilot valve to restore it to its initial position. When the pressure in discharge conduit 9 decreases, a similar action takes place except in the opposite direction, valve 15 being moved toward closed position to effect an increase in the speed of the supercharger to restore the pressure. The structure so far described is a known one and is to be taken as typical of any turbosupercharger system operating in conjunction with an internal combustion engine to supercharge it. It is this system in conjunction with which I have elected to illustrate my improvements. It is to be understood that my improvements may be used in conjunction with other turbosupercharger arrangements.

When an engine equipped with a turbosupercharger operates under certain conditions, for example, when throttled or otherwise slowed down when operating at high altitudes, a condition may obtain where insufficient exhaust gases are delivered from the engine to the turbosupercharger to maintain the speed of the turbosupercharger high enough to provide the required manifold pressure. Operation then becomes unstable and both the engine and the turbosupercharger lose nearly all power. As a result, the engine will not pick up power quickly when the throttle is opened or the operating condition which caused the engine slow down no longer obtains as time is required to again build up the supply of exhaust gases and the supercharger speed. In the case of an aircraft, a known remedy for this situation once it has occurred is to drive the aircraft so that the engine speed is increased through pressure of wind on the propeller. However, this is not a desirable remedy.

According to my invention, I provide in connection with a turbosupercharger, means whereby gases from an auxiliary or supplemental source may be supplied to the turbosupercharger nozzle box when the primary supply from the internal combustion engine becomes insufficient to effect operation of the supercharger at a speed sufficiently high to maintain the desired intake manifold pressure. To this end, in accordance with the embodiment of my invention which I have elected to illustrate, I provide an auxiliary combustion chamber 30 which, on its inlet side, is connected through a carburetor 31 and a conduit 32 with conduit 9, and on its discharge side is connected by a conduit 33 to conduit 5, there being arranged between the combustion chamber 30 and the carburetor a suitable backfire grid 34. Carburetor 31 is supplied with fuel through a pipe 35 in which is located a control valve 36. In the combustion chamber is a suitable spark plug 37 connected in an ignition circuit 38, which may include a spark coil 39, a low tension circuit 39a, and a source of electrical energy 40, and in conduit 32 is a valve 47 provided on its spindle with an operating arm 48.

Now when the supply of exhaust gases becomes insufficient to maintain the desired supercharger speed air and fuel are supplied to combustion chamber 31 by opening valves 47 and 36 and the ignition is turned on whereby the air and fuel will be burned to provide gases which are supplied to the nozzle box 11 to supplement the gases supplied from the engine, the valves being opened enough so that sufficient gases are generated in the combustion chamber to maintain the supercharger speed.

Valves 36 and 47 and the ignition circuit may be controlled by any suitable means, manual or otherwise. Preferably, I control them automatically in connection with the turbosupercharger control.

In circuit 39a is a circuit closer comprising a pair of fixed contacts 41 adapted to be engaged by a movable contact 42 connected to an extension of piston rod 22. The arrangement is such that when piston 17 is moved downwardly to an extent such that valve 15 is fully closed, movable contact 42 engages contacts 41 and remains in engagement therewith during further downward movement of the piston. In connection with ignition coil 39, I may, if desired, provide a suitable cutout 43 controlled by a temperature responsive device 44 associated with combustion chamber 30 whereby when the temperature in the combustion chamber reaches a predetermined high value, the ignition coil is put out of operation. A known form of device is indicated diagrammatically comprising a bellows 45 which is operated by temperature responsive device 44 to open a normally closed switch 46 in the ignition coil circuit.

The arm 48 on the spindle of valve 36 is connected by a link 49 to one end of a pivoted lever 50, the other end of which is connected by a link 51 to one arm of a bell crank lever 52 pivoted on a fixed support at 53 and having the free end of its other arm standing in the path of movement of a head 54 on the upper end of the extension of rod 22. Fuel valve 36 is provided with an arm 55 which is also connected to link 49. The arrangement is such that after piston 17 has moved downwardly in its cylinder to a point at which valve 15 is fully closed, head 54 engages the free arm of bell crank lever 52 to effect a movement of the linkage system in a direction to open valves 47 and 36, the valves starting to open at the same time the ignition circuit is closed. Valves 47 and 36 are biased toward closed position by a suitable spring 56.

When valve 15 is fully closed, it engages the wall of conduit 14 which forms a stop to prevent further movement. To permit movement of piston 17 after valve 15 is closed, there is provided in rod 16 a suitable lost motion device 57, here shown in the form of a casing interposed in rod 16 within which is a spring 58 which bears against a head 59 on an upper section of rod 16. With this arrangement, after valve 15 is fully closed, further downward movement of piston 17 may take place by movement of head 59 in the casing, spring 58 being compressed to permit of such movement.

With the foregoing arrangement if, after valve 15 is fully closed, there is insufficient exhaust gas from the engine to maintain operation of the supercharger at a speed sufficient to keep the pressure in conduit 9 at the desired value, then decrease in pressure in conduct 9 effects an upward movement of movable abutment 25 to lift the pilot valve heads, admitting fluid pressure above piston 17 to move piston 17 downward, thereby closing the ignition circuit at contacts 41 and operating the bell crank lever to effect opening of fuel valve 36 and air valve 47 whereupon air and fuel will be supplied through carburetor 31 to ignition chamber 30 to provide a supplemental supply of gas for maintaining operation of the supercharger. The air and fuel valves 47 and 36 will be opened by the control means to the extent needed to supply the required additional gases for maintaining the turbosupercharger speed and when engine operating conditions again become such that gases in addition to those supplied by the engine exhaust are no longer needed, valves 47 and 36 will be again closed and the ignition current opened.

In accordance with the provisions of the patent statutes, I have described the principle of operation of my invention, together with the apparatus which I now consider to represent the best embodiment thereof, but I desire to have it understood that the apparatus shown in only illustrative and that the invention may be carried out by other means.

What I claim as new and desire to secure by Letters Patent of the United States is:

1. The combination with an internal combustion engine and a turbosupercharger operated by exhaust gases from the engine for supplying compressed air to the engine, of auxiliary means for supplying gases to the turbosupercharger to supplement the supply from the internal combustion engine, a first valve means controlling the supply of exhaust gases to the turbosupercharger, a second valve means controlling said auxiliary gas supplying means, and automatic means responsive to pressure of the air supplied by the turbosupercharger to the engine for actuating said two valve means in a sequential order such that the second valve means is actuated to supply gas to the turbosupercharger to supplement the supply controlled by said first valve means.

2. In combination, an internal combustion engine, a gas turbine, a conduct connecting the exhaust conduit of the engine to the turbine for supplying gas thereto, a compressor driven by the turbine, a conduit connecting the discharge side of the compressor to the engine intake, a by-pass conduit connecting the discharge side of the compressor to the gas turbine, a combustion chamber in said by-pass conduit, means for supplying fuel to the combustion chamber, valve means for controlling flow of air through said by-pass conduit and flow of fuel through said fuel supplying means, and means responsive to pressure on the discharge side of the compressor for controlling said valve means.

3. In combination, an internal combustion engine, a gas turbine, a conduit connecting the exhaust conduit of the engine to the turbine for supplying gas thereto, a compressor driven by the turbine, a conduit connecting the discharge side of the compressor to the engine intake, a by-pass conduit connecting the discharge side of the compressor to the gas turbine, a combustion chamber in said by-pass conduit, means for supplying fuel to the combustion chamber, valve means for controlling flow of air through said by-pass conduit and flow of fuel through said fuel supplying means, valve means controlling the supply of exhaust gases to the gas turbine, and automatic means responsive to pressure of the air supplied by the compressor to the turbine for actuating said two valve means in a sequential order such that the first valve means is actuated to supply gas to the turbosupercharger to supplement the supply controlled by said second valve means.

DAVID C. PRINCE